(12) United States Patent
Newport et al.

(10) Patent No.: US 9,534,964 B2
(45) Date of Patent: Jan. 3, 2017

(54) THREE-PHASE EMULSIONS USED IN A TEMPERATURE CONDITION INDICATOR

(71) Applicant: TEMPTIME CORPORATION, Morris Plains, NJ (US)

(72) Inventors: John F. L. Newport, Chadds Ford, PA (US); Dawn E. Smith, Martinsville, NJ (US); Dene H. Taylor, New Hope, PA (US); Brian Huffman, Belle Mead, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 226 days.

(21) Appl. No.: 14/314,881

(22) Filed: Jun. 25, 2014

(65) Prior Publication Data

US 2015/0000588 A1 Jan. 1, 2015

Related U.S. Application Data

(60) Provisional application No. 61/839,658, filed on Jun. 26, 2013, provisional application No. 61/894,715, filed on Oct. 23, 2013.

(51) Int. Cl.
*G01K 11/12* (2006.01)
*G01K 3/04* (2006.01)

(52) U.S. Cl.
CPC ............... *G01K 11/12* (2013.01); *G01K 3/04* (2013.01); *G01K 2207/04* (2013.01)

(58) Field of Classification Search
CPC ....... G01K 3/04; G01K 11/12; G01K 2207/04
USPC ........ 116/207, 216, 217, 218, 219; 374/106, 374/162; 252/408.1
See application file for complete search history.

(56) References Cited

U.S. PATENT DOCUMENTS

| | | | |
|---|---|---|---|
| 6,258,747 B1 | 7/2001 | Midorikawa et al. | |
| 6,514,909 B1 | 2/2003 | Austin et al. | |
| 7,036,452 B1 | 5/2006 | Tester | |
| 7,776,927 B2 | 8/2010 | Chu et al. | |
| 8,430,053 B2 | 4/2013 | Taylor et al. | |
| 9,297,706 B2* | 3/2016 | Smith | G01K 3/04 |
| 2013/0313483 A1* | 11/2013 | Mace | B03B 5/28 252/408.1 |
| 2015/0090623 A1* | 4/2015 | Grabiner | B65D 51/245 206/459.1 |
| 2015/0153315 A1* | 6/2015 | Taylor | G01N 31/229 116/207 |

OTHER PUBLICATIONS

Search Report and Written Opinion dated Oct. 30, 2014 issued for International PCT Application No. PCT/US14/44252.

* cited by examiner

*Primary Examiner* — Richard A Smith
(74) *Attorney, Agent, or Firm* — K&L Gates LLP (57) ABSTRACT

Described herein are temperature condition indicators (e.g. freezing, threshold temperature, thermal history indicators, etc.) comprising three phase emulsions. Methods of forming and using these indicators, and products that include these indicators, are also disclosed.

20 Claims, 2 Drawing Sheets

THREE-PHASE EMULSIONS USED IN A TEMPERATURE CONDITION INDICATOR

PRIORITY CLAIM AND CROSS-REFERENCE TO A RELATED APPLICATION

This application claims the benefit of U.S. Provisional Patent Application No. 61/839,658, filed on Jun. 26, 2013 and U.S. Provisional Patent Application No. 61/894,715, filed on Oct. 23, 2013. The entire disclosures of both applications are incorporated by reference herein for all purposes.

BACKGROUND

Many commercial products are sensitive to temperature conditions, such as freezing, thawing, high or low temperatures, and/or extended periods of time at elevated temperature, and may lose efficacy or quality under any of these conditions. Examples of temperature-sensitive commercial products include certain pharmaceuticals, medical products, and foodstuffs as well as some industrial products. Thus, there is a continued need for additional temperature condition indicators.

SUMMARY

A three-phase emulsion can be used as an indicator dispersion in a temperature condition indicator. Such an indicator dispersion includes a base phase, a barrier phase dispersed in the base phase, and an active phase dispersed in the barrier phase. Typically, the active phase is miscible with the base phase, the barrier phase is substantially insoluble in the base phase, and the active phase is substantially insoluble in the barrier phase. Thus, for example, an indicator dispersion could be an water-in-oil-in-water (w/o/w) emulsion, an oil-in-water-in-oil (o/w/o) emulsion, a water-in-wax-in-water dispersion, etc. The emulsion has a composition such that, when a temperature condition is met, the active phase and the base phase mix to form a combined phase. If the combined phase is formed, an apparent color change occurs in the indicator dispersion, such as in the combined phase, or in the dispersion as a whole. The color change is typically irreversible.

Some embodiments include a temperature condition indicator comprising: a housing; and an indicator dispersion within the housing, wherein the indicator dispersion comprises: a base phase; a barrier phase dispersed in the base phase; and an active phase dispersed in the barrier phase; wherein the active phase is miscible with the base phase; wherein the barrier phase is substantially insoluble in the base phase, and the active phase is substantially insoluble in the barrier phase; and wherein the temperature condition indicator is configured so that before the temperature condition is met, the barrier phase effectively separates the active phase from the base phase; and the temperature condition indicator is configured so that if the temperature condition is met, a significant amount of mixing will occur between the active phase and the base phase to form a combined phase; wherein, if the combined phase is formed, a detectable and irreversible change in an apparent color of the indicator dispersion occurs; and wherein the housing is configured so that the detectable and irreversible change in the apparent color of the indicator dispersion is detectable externally of the temperature condition indicator by visual inspection or by an optical instrument.

Some embodiments include a label for a perishable good, comprising a temperature condition indicator described herein.

Some embodiments include a package for a perishable good, comprising a temperature condition indicator described herein.

Some embodiments include a package containing a perishable good, comprising a temperature condition indicator described herein.

Some embodiments include a method of protecting a perishable item, comprising coupling the perishable item with a temperature condition indicator described herein so that the temperature condition indicator is subject to substantially the same temperature conditions as the perishable item.

Some embodiments involve use of a temperature condition indicator described herein in monitoring the quality of a perishable good.

Some embodiments include a method of detecting a temperature condition, comprising subjecting a temperature condition indicator described herein to conditions under which the temperature condition might occur, and observing whether a detectable and irreversible change in the apparent color of the indicator dispersion occurs.

These and other example embodiments are described in greater detail herein.

DETAILED DESCRIPTION

Administration of vaccines provides a cost-effective health intervention that can save or improve, millions of lives globally. The biological activity of vaccines is attributable to complex organic macromolecules, for example, proteins, having particular three-dimensional conformations. When exposed to extremes in temperature, including freezing temperatures or near-freezing temperatures, high temperatures, or warm temperatures for an extended period of time, vaccines can lose potency. A low-potency vaccine, if administered to a subject, may fail to protect the subject from a serious or fatal disease.

Warm temperatures can also affect vaccine quality adversely. Because of this, vaccines are generally refrigerated, or cooled by other suitable means, during storage and distribution to end-users. Such cooling means may introduce a risk that some or all vaccine samples in a batch of samples may suffer exposure to freezing or near-freezing temperatures due to cold spots within the container, poorly controlled refrigeration, or other factors. Similar considerations apply to various other commercial products, for example biological pharmaceuticals in some genetically engineered pharmaceuticals, as well as food stuffs, and other commercial products, some of which are described elsewhere herein.

To help mitigate problems associated with undesirable temperature conditions, a temperature condition indicator can be associated with the vaccine, or another host product, to provide an optical signal alerting a health worker, or other end-user, that the vaccine may have lost potency and possibly should not be used.

Breakdown of a three-phase dispersion can be used as an operating principle for a temperature condition indicator. Generally, the indicator can comprise an indicator dispersion which contains two miscible phases which are separated by a barrier phase. Thus, an indicator dispersion can comprise a base phase; a barrier phase dispersed in the base phase; and an active phase dispersed in the barrier phase. Typically, the active phase is miscible with the base phase, the barrier phase is not completely soluble in, or is substantially insoluble in, the base phase, and the active phase is not completely soluble in, or is substantially insoluble in, the barrier phase. Thus, the barrier phase effectively separates the active phase from the base phase so that base phase does not substantially mix with the active phase as long as the dispersion is intact.

Figure 1:
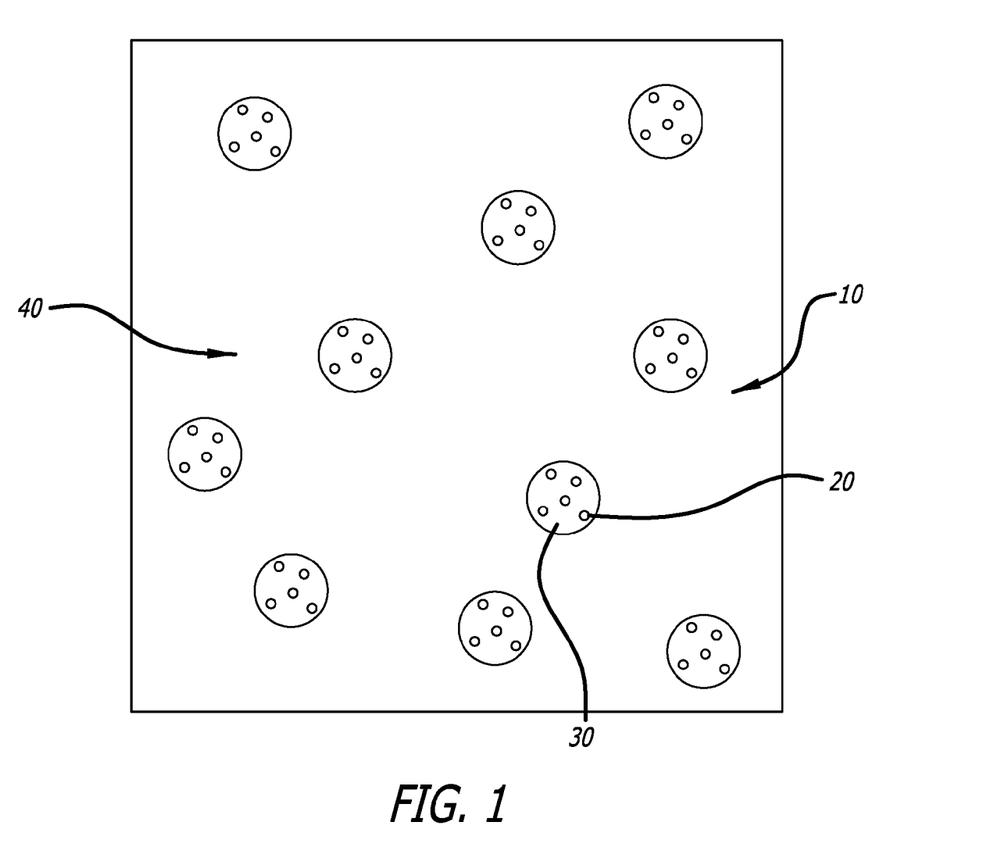
FIG. 1 is a schematic diagram of an example embodiment of an indicator dispersion.

FIG. 1 is a schematic depiction of an embodiment of an indicator dispersion 10. Active phase 20 may be dispersed in barrier phase 30. A colorant may be dispersed in active phase 20. Barrier phase 30 may in turn be dispersed in base phase 40, so that indicator dispersion 10 is a three phase emulsion. Other configurations of indicator dispersion may be used that operate on the same principle. For example, the relative amounts, relative particle sizes, number of particles, and/or other parameters may be varied while utilizing the same basic principle.

The dispersion can remain intact until a temperature condition is met. If the temperature condition is met, the dispersion can break down, or some other change can occur, so that a significant amount of mixing will occur between the active phase and the base phase to form a combined phase. If the combined phase is formed, a detectable and irreversible change in an apparent color of the indicator dispersion will occur. Thus, this detectable and irreversible change in apparent color allows a potential user to discern if a temperature condition has occurred that could cause a product to be spoiled.

In some embodiments, the barrier phase may have a solubility in the base phase that is less than about 1%, less than about 0.01%, less than about 0.001%, or less than about 0.0001%.

In some embodiments, the active phase may have a solubility in the barrier phase that is less than about 1%, less than about 0.01%, less than about 0.001%, or less than about 0.0001%.

For example, an o/w/o emulsion or a w/o/w emulsion could be used. For an o/w/o emulsion, the oil phase dispersed in the water phase is the active phase, the water phase is the barrier phase, and the oil phase in which the water phase is dispersed is the base phase. For a w/o/w emulsion, the water phase dispersed in the oil phase is the active phase, the oil phase is the barrier phase, and the water phase in which the oil phase is dispersed is the base phase. Similar assignments can be made to other three-phase emulsions containing other types of phases that are not oil or water. A three-phase dispersion could also include a solid phase instead of being an emulsion. For example, such a dispersion could have a liquid oil base phase, an aqueous barrier phase, and a hydrophobic solid active phase. Alternatively, an indicator dispersion could have an aqueous base phase, a hydrophobic solid barrier phase, and an aqueous active phase.

This type of three-phase dispersion can be used to detect many types of temperature condition, such as a threshold temperature (a high temperature and/or a low-temperature threshold), a phase transition (such as freezing or melting), or a thermal history, such as an elevated temperature for a particular period of time or a depressed temperature for a particular period of time. Thus, a three-phase dispersion can be used for any kind of temperature condition indicator, such as a threshold temperature, including a high temperature threshold indicator or a low-temperature threshold indicator, a thermal history indicator, a freeze indicator, a melt indicator, or a combination thereof.

There are two basic factors that can affect how an indicator dispersion operates. First, the cause or mechanism of mixing of the active and base phases can determine, or can be used to select, what type of temperature condition the indicator dispersion is used to detect. Second, the manner in which mixing between the active phase and the base phase affects color can determine, or can be used to select, the nature of the apparent color change.

For some indicator dispersions, mixing between the active phase and the base phase can be a result of freezing. For example, when the water in an o/w/o emulsion freezes, the active oil phase and the base oil phase can coalesce and mix. Similarly, if water in a w/o/w emulsion freezes, the base phase may freeze first because the likelihood of nucleation decreases as volume decreases. As the base phase freezes, water forms ice crystals that grow, forcing the oil droplets closer, which may result in partial or complete coalescence of the oil phase. The coalesced oil phase may rise to the top of the frozen base phase. Since water expands upon freezing, the base phase can compress the oil phase, which can cause the w/o emulsion of the barrier and aqueous phase to break so that, upon thawing, the active phase and the base phase can mix.

For some indicator dispersions, mixing between the active phase and the base phase can be a result of melting. For example, if a dispersion has a solid wax barrier phase, melting of the wax can cause the aqueous active phase to coalesce into the aqueous base phase.

For some indicator dispersions, mixing between the active phase and the base phase can be a result of phase inversion between the active phase and the barrier phase or inversion between the barrier phase and the base phase. For example, some surfactants, such as non-ionic surfactants, have a hydrophilic-lipophilic balance (HLB) that varies with temperature. The HLB value is a measure of the relative hydrophilicity or lipophilicity of a surfactant. A surfactant that is more soluble in water than in oil will have an HLB value greater than 10, and a surfactant that is less soluble in water than in oil will have an HLB value of less than 10.

In an emulsion, the continuous phase tends to be the phase in which the surfactant is more soluble. Thus, surfactants with a low HLB value tend to form water-in-oil (w/o) emulsions. Surfactants with a high HLB value tend to form oil-in-water (o/w) emulsions. Thus, if the HLB value of the surfactant is dependent upon temperature, an emulsion can invert as a result of a significant temperature change. For example, some surfactants, such as some non-ionic surfactants, can have a low HLB value (e.g., less than about 6) at higher temperatures, which can produce a w/o emulsion at higher temperatures. The same surfactant can have a high HLB value (e.g., greater than about 10) at lower temperatures. This can cause a w/o emulsion formed at a higher temperature to invert to an o/w at a significantly lower temperature as the HLB value increases. Thus, if a w/o/w emulsion comprising such a surfactant experiences a temperature drop to a threshold temperature, the oil barrier phase and the aqueous active phase can invert so that the aqueous base phase and the aqueous active phase are combined. Alternatively, if a w/o/w emulsion comprising such a surfactant experiences a temperature increase to a threshold temperature, the aqueous base phase and the oil barrier phase can invert so that the aqueous active phase and the aqueous base phase are combined. Similar inversions can occur with o/w/o emulsions. Solid emulsion stabilizers, such as Pickering emulsifiers, may also have emulsion inversion properties.

By way of illustration, the HLB required for an o/w emulsion is about 14 for castor oil, about 10 for corn oil, about 5-6 for cottonseed oil, about 6-7 for hydrogenated peanut oil, about 6-7 for jojoba oil, about 12 for mehadin oil, about 9-12 for mineral oil, about 10 for palm oil, about 16 for pine oil, about 6 for rapeseed oil, about 7-8 for silicone oil, and about 6 for soybean oil. Thus, surfactants that have HLB values in those ranges near the threshold temperature can be used in threshold temperature indicators. In some embodiments, the surfactant has a HLB of about 3 to about 6 above a threshold temperature; and/or an HLB of about 8 to about 28, about 8 to about 20, about 8 to about 15, or about 8 to about 12 below a threshold temperature. In some embodiments, the surfactant has a HLB of about 13 to about 15, about 9 to about 11, about 5 to about 6, about 6 to about 7, about 7 to about 8, about 11 to about 13, about 9 to about 12, about 15 to about 17, about 5 to about 7, about 14, about 10, about 12, about 10, about 16, or about 6 at about the threshold temperature, and the surfactant has an HLB that decreases as temperature increases.

Examples of useful nonionic surfactants may include ethoxylate surfactants such as fatty acid ethoxylates, fatty alcohol ethoxylates, sugar or sugar alcohol based ethoxylates, ethoxylated oils (such as ethoxylated castor oil, ethoxylated corn oil, ethoxylated soybean oil, etc), alkylphenol ethoxylates, etc. In some embodiments, nonionic surfactant can a fatty acid or a fatty alcohol portion having about 10 to about 30, about 12 to about 24, or about 16 to about 24 carbon atoms. In some embodiments, the ethoxylated portion of a nonionic surfactant contains about 1 to about 500, about 1 to about 50, about 3 to about 12, about 1 to about 2, about 2 to about 4, about 4 to about 6, about 6 to about 8, about 8 to about 10, about 10 to about 12, about 12 to about 14, about 4 to about 8, or about 20 ethoxylate units. In some embodiments, an alkylphenol ethoxylate contains a $C_{2-20}$, a $C_{5-15}$, a $C_{6-10}$, or a $C_{8-10}$ alkyl group.

Some surfactants, such as cationic surfactants, can experience a large change in HLB value with pH. Such a surfactant can be combined with a buffer that has a pH that varies with temperature so that the barrier phase and the active phase, or the active phase and the barrier phase, invert either when a threshold low temperature is reached, or a when threshold high temperature is reached, depending upon the combination of surfactant and buffer used.

In some embodiments, the cationic surfactant having a pH dependent HLB is a fatty amine or a derivative thereof. Some examples of the HLB values for fatty acid amines or derivatives at different pH values are shown in Table 1 below.

TABLE 1

| Surfactant | HLB above pH 9 | HLB below pH 8 |
|---|---|---|
| Armeen ® 12D | 10.7 | 21.3 |
| Armeen CD | 10.2 | 20.8 |
| Armeen 16 | 8.8 | 19.4 |
| Armeen HTD | 8.3 | 18.9 |

TABLE 1-continued

| Surfactant | HLB above pH 9 | HLB below pH 8 |
|---|---|---|
| Armeen HT | 8.3 | 18.9 |
| Armeen OD | 8.2 | 18.8 |
| Armeen 18D (Stearylamine) | 7.9 | 18.5 |
| Armeen 2C | 4 | 14.6 |
| Armeen 2HT | 0.1 | 10.7 |
| Armeen DMCD | 9.3 | 19.9 |
| Armeen DM16D (N,N-dimethyl-hexadecan-1-amine) | 7.9 | 18.5 |
| Armeen DMHTD | 7.3 | 17.9 |
| Armeen DMOD | 7.2 | 17.8 |
| Duomeen ® C | 18.2 | 39.4 |
| Duomeen T | 16.3 | 37.5 |
| Duomeen O (n-octadecylpropane-1,3-diamine) | 16.2 | 37.4 |
| Triameen ® YT | 24.2 | 56 |
| Ethomeen ® C/12 (PEG-2 Cocamine) | 12.1 | 21 |
| Ethomeen C/15 | 13.3 | 23.7 |
| Ethomeen C/25 (PEG-15 Cocamine) | 16.4 | 27 |
| Ethomeen T/15 (tallow amine ethoxylate) | 11.1 | 21.7 |
| Ethomeen T/20 (tallow amine ethoxylate) | 12.8 | 23.4 |
| Ethomeen T/30 | 16.1 | 26.7 |
| Ethomeen S/12 | 10.1 | 20.7 |
| Ethomeen 18/15 | 10.7 | 21.3 |
| Ethomeen O/12 | 9.8 | 20.4 |
| Ethoduomeen T/25 | 23.1 | 44.3 |
| Ethomid ® O/15 (Ethoxylated(5)oleamide) | 11.2 | 21.8 |
| Aromox ® 14DW-970 (Tetradecyl-dimethylamine oxide) | 18.6 | 21.4 |
| Aromox C/12 (cocobis(2-hydroxy-ethyl)amine oxide, based on coco amine + 2 EO) | 21.8 | 24.6 |
| Aromox DMC | 21.9 | 24.7 |
| Aromox T/12 (Bis(2-hydroxyethyl)-tallowalkylamine oxide) | 19.9 | 22.7 |

For some indicators, a dispersion may break as a result of osmosis. The basic principle is that, for a w/o/w emulsion, or another emulsion containing two aqueous phases, a difference in solute concentration between the two aqueous phases can cause water to diffuse through the oil layer. This diffusion will stress the emulsion so that eventually the emulsion breaks, allowing the two aqueous layers to mix.

The rate of diffusion of water through the oil layer, or another type of barrier layer, can depend upon the temperature of the emulsion. Thus, at higher temperatures, the water can diffuse faster, and the emulsion can break in a shorter time than would occur at lower temperatures. Thus, a dispersion which breaks as a result of osmosis can be used to indicate a particular thermal history.

In some indicator dispersions, the active phase can have a higher solute concentration than the base phase. For these types of dispersions, water will migrate from the base phase to the active phase. In some embodiments, the base phase is free of solute, and the active phase contains about 1% (w/w) to about 40% (w/w), about 5% (w/w) to about 20% (w/w), or about 10% (w/w) sodium chloride. For other indicator dispersions, the active phase has a lower solute concentration than the base phase. For these types of dispersions, water will migrate from the active phase to the base phase. In some embodiments, the active phase is free of solute, and the base phase contains about 1% (w/w) to about 40% (w/w), about 5% (w/w) to about 20% (w/w), or about 10% (w/w) sodium chloride.

In some embodiments, the starting time for the thermal history of interest can be initiated, or delayed, by a simple method. Thermal history indicators are typically be kept very cold (e.g about −20° C.) until their point of use. Here a w/o/w emulsion can be made such that, initially, the solute concentrations in the active and base water phases are equal such that there is no osmotic driving force. Subsequently the w/o/w emulsion can be diluted with water causing an imbalance in the solute concentrations and initiating flow of water from the base to active phase and thus the start of the timed thermal history. This dilution can be conducted prior to introducing the w/o/w emulsion into the thermal history measuring device or, alternatively, the thermal history measuring device can contain a separate reservoir of water. Alternatively, both the base and the active phase can initially be water, and a solution, such as a concentrated salt solution, can be added to the base phase. At the point of use this reservoir can be punctured by an applied force causing it to mix with the w/o/w emulsion and start the thermal history measurement of interest.

Threshold and freezing temperatures of any desired value may be detected using the devices described herein. In some embodiments, a temperature condition indicator is used to detect a freezing event that occurs from about −10° C. to about 10° C., about −2° C. to about 5° C., or about 0° C. to about 3° C. In some embodiments, a threshold temperature indicator is used to detect a high temperature threshold of about 5° C. to about 60° C., about 5° C. to about 50° C., about 10° C. to about 40° C., about 20° C. to about 40° C., about 20° C. to about 30° C., about 30° C. to about 40° C., or about 40° C. to about 60° C. In some embodiments, a threshold temperature indicator is used to detect a low temperature threshold of about −5° C. to about 20° C., about 1° C. to about 10° C., or about 1° C. to about 5° C.

A particular thermal history may be defined by a temperature and a time. For example, a temperature condition indicator could be configured to detect exposure to a temperature of about 25° C. for a day. This expression indicates that if the indicator is at a temperature of about 25° C. for at least a day, the thermal condition indicator will detect that thermal history. It is also understood that this indicator will also detect thermal history equivalents of this particular history. A thermal history equivalent is a thermal history that brings about a similar chemical change, such as the diffusion of a similar amount of water from one aqueous layer to another. For example, if the same indicator described above is at a temperature significantly greater than 25° C., the indicator will detect the equivalent thermal history in a shorter time because the diffusion will occur at a more rapid rate at a higher temperature. Thus, a thermal condition indicator configured to detect exposure to a temperature of about 25° C. for a day will also detect exposures at higher temperatures for a shorter time, provided that a similar chemical change is brought about.

In some embodiments, a thermal condition indicator is configured to detect exposure to a temperature of about 10° C. for 1 day, 2 days, 7 days, 14 days, or 30 days. In some embodiments, a thermal condition indicator is configured to detect exposure to a temperature of about 15° C. for 1 day, 2 days, 7 days, 14 days, or 30 days. In some embodiments, a thermal condition indicator is configured to detect exposure to a temperature of about 25° C. for 1 day, 2 days, 7 days, 14 days, or 30 days. In some embodiments, a thermal condition indicator is configured to detect exposure to a temperature of about 30° C. for 1 day, 2 days, 7 days, 14 days, or 30 days. In some embodiments, a thermal condition indicator is configured to detect exposure to a temperature of about 35° C. for 1 day, 2 days, 7 days, 14 days, or 30 days. In some embodiments, a thermal condition indicator is configured to detect exposure to a temperature of about 40° C. for 1 day, 2 days, 7 days, 14 days, or 30 days. In some embodiments, a thermal condition indicator is configured to detect exposure to a temperature of about 45° C. for 1 day, 2 days, 7 days, 14 days, or 30 days.

One advantage of three-phase temperature condition indicators is that it can allow more than one type of thermal condition to be detected in a device. For example, a single w/o/w indicator emulsion could be a combined freeze, high temperature, and thermal history indicator:

1. freezing of the water phases could cause the active phase and the base phase to mix;
2. the oil barrier phase could be dispersed in the aqueous base phase using a non-ionic surfactant, so that above a threshold temperature, this o/w emulsion between the aqueous base phase and the barrier phase inverts to a w/o emulsion, thus mixing the active phase and the base phase; and
3. the active phase and the base phase could have different solute concentrations, so that the emulsion breaks if a particular thermal history occurs.

For the combined indicator above, substitutions could be made. For example, a different surfactant could be used to disperse the aqueous active phase in the oil barrier phase so that below a threshold temperature the w/o emulsion between the aqueous active phase and the oil barrier phase inverts to an o/w emulsion so that the active phase and base phase mix.

The cause or mechanism of the detectable and irreversible change in the apparent color of the indicator dispersion can be independent of the manner in which the active phase and the base phase mix. Thus, any of these color change mechanisms can be used with any mechanism or method described above with respect to the mixing of the active phase and the base phase.

One method or mechanism for causing a detectable and irreversible change in apparent color of the indicator dispersion by mixing the active phase and the base phase is light scattering. For example, the active phase and/or the barrier phase may have a particle size in a range that results in a significant amount of light scattering, which may change, reduce, or even substantially eliminate the appearance of the natural color of a colorant in the active phase.

For example, light scattering can mask a color, such as a dark color, so light scattering causes a colorant to appear lighter than it would normally appear. When a colored material, such as a colorant, is present in the active phase that is dispersed as small particles within the barrier phase, some light may be scattered so that it has less contact with the colored compound or material. Thus, the color can appear different, for example, less intense than the natural color of the colorant. Scattering may also affect the apparent color or hue of a colorant in a dispersion, for example making a dispersion appear more red (e.g. making an orange appear more red, or a yellow appear orange) or blue (e.g. making a yellow appear greenish or a green appear blue) than the natural color of the colorant. Scattering may also affect the apparent color or hue of a background viewed through a dispersion. Thus, the apparent color may be substantially lighter or otherwise different due to light scattering, while the natural color itself does not change.

Color includes achromatic visual appearances, for example, black, gray, and white, and chromatic visual appearances, including primary color hues, secondary color hues and/or other color hues, for example, without limitation, red, yellow, green, blue, purple, orange, brown, etc. The natural color of the colorant refers to the appearance of the colorant, including, intensity, shade, tint, hue, etc., in the same medium and at the same concentration or amount without any scattering effect. The term "color change" and its grammatical variants are used to refer to changes in hue, intensity or lightness (or darkness) or other changes in visual appearance.

For some indicator dispersions, the active phase or the barrier phase can have a droplet size such that, before the temperature condition is met, light scattering affects the apparent color of the indicator dispersion. The active phase can have a colorant that is not present in the base phase before the two phases mix. Thus, when the temperature condition is met, mixing of the active phase and the base phase can cause the colorant to be introduced into the base phase and color the newly formed combined phase. The colorant that is in the combined phase should not be affected by light scattering in the same way that the colorant in the active phase was before the temperature condition was met. As a result, the color of the combined phase, or the color of the indicator dispersion in general, appears different. Thus, a temperature condition may be detected by a color change with respect to the apparent color of the indicator dispersion or the combined phase. In some embodiments, the color of the combined phase, or the color of the indicator dispersion in general, appears darker.

Mixing of the active phase and the base phase or breakdown of the dispersion can have an effect on apparent color that goes beyond transfer of a colorant from one phase to another. Mixing of the active phase and the base phase can also affect the light scattering properties of the dispersion. For example, the size of the particles of the active phase and/or the barrier phase could become larger, which could change the light scattering properties of the dispersion. Additionally, although for convenience we refer to the system as the indicator dispersion after mixing of the active phase and the base phase, the dispersion may no longer exist at this point, which could significantly reduce the scattering effect or eliminate it altogether. Thus, mixing the active phase and the base phase can cause a change in light scattering that can contribute to the detectable and irreversible change in the apparent color of the indicator dispersion.

Upon mixing of the active and the base phase, a substantial amount of, or substantially all of, the active phase of the indicator dispersion may no longer be dispersed in the barrier phase. Similarly, upon mixing of the active and the base phase, a substantial amount of, or substantially all of the barrier phase may no longer dispersed in the base phase. Thus, the indicator dispersion can be broken to form a two phase system comprising the barrier phase and a combined phase formed from the active phase and the base phase, wherein the two phases are substantially not dispersed in one another. After the temperature condition is met, when the emulsion is broken, the indicator can appear blotchy rather than uniform.

For an indicator dispersion having a color change affected by light scattering, an active phase may have any droplet size that results in light scattering by the active phase and/or the barrier phase so that light scattering at least partially masks or alters the color of the colorant. Scattering may increase as the size of dispersed particles decreases. For example, it can be helpful if the aqueous active phase has an average droplet size near the wavelength range of visible light, such as about 10 nm to about 2000 nm, about 100 nm to about 1200 nm, about 350 nm to about 900 nm, or about 390 nm to about 700 nm.

In some embodiments, the barrier phase has an average droplet size near the wavelength range of visible light, such as about 10 nm to about 2000 nm, about 100 nm to about 1200 nm, about 350 nm to about 900 nm, or about 390 nm to about 700 nm.

In some embodiments, the barrier phase has an average droplet size of about 100 nm to about 2000 nm, about 350 nm to about 450 nm, about 450 nm to about 550 nm, about 550 nm to about 650 nm, about 650 nm to about 1000 nm, about 1000 nm to about 2000 nm; and the aqueous active phase as average droplet size of about 10 nm to about 500 nm, about 10 nm to about 50 nm, about 50 nm to about 100 nm, about 100 nm to about 200 nm, about 200 nm to about 300 nm, about 300 nm to about 400 nm, or about 400 nm to about 500 nm.

The light scattering effect can be modified or tuned by varying the particle size of both the active phase and the barrier phase. For example, an emulsion with 10 nm droplets of the active phase inside 100 nm droplets of the barrier phase dispersed in a base phase would have a different scattering effect than an emulsion in which the active phase droplets were 10 nm and the barrier phase droplets were 500 nm, or an emulsion in which the active phase droplets were 100 nm and the barrier phase liquid droplets were 1000 nm. However, in any of these emulsions, there would be a light scattering effect that could be utilized to develop an indicator that looks different after a temperature condition breaks or partially breaks the emulsion structure.

It is helpful if a colorant in an active phase is dispersible or soluble in the medium of the active phase and the base phase to the extent that the natural color of the colorant may be observed as a result of mixing between the active phase and the base phase.

An opacifying agent may be used to effect a change in apparent color upon mixing of the base phase and the active phase. For example, a colorant could be present in the active phase but not the base phase. An opacifying agent could be present in the barrier phase, which can cause the dispersion to be opaque so that the inherent color of the colorant is at least partially masked by the opacity of the indicator dispersion. Mixing of the active phase and the base phase can transfer the colorant to the base phase, so that at least a portion of the colorant is less obscured by the opacifying agent because the clarity of the base phase is less obscured by the barrier phase than is the active phase and/or because the dispersion is broken.

An opacifying agent could be any pigment or dye that is dispersible or soluble in the barrier phase. Examples of useful opacifying agents include oxides, sulfides, carbonates and the like of titanium, cerium, zirconium, magnesium, iron, manganese, calcium, cadmium, tin, barium and the like. In some embodiments, the opacifying agent is titanium oxide.

A change in apparent color may also be due to a chemical reaction which occurs if the active phase mixes with the base phase. This may be because the active phase contains an agent which is reactive with some component present in the base phase. Alternatively, the active phase could comprise a first active sub-phase comprising a first chemically active agent and a second active sub-phase comprising a second chemically active agent. Each particle of the active phase would contain only the first chemically active agent or the second chemically active agent. Thus, the barrier phase would separate the first active sub-phase from the second active sub-phase. If mixing between the active phase and the base phase occurred, particles from both the first active sub-phase and the second active sub-phase would mix with the base phase. Therefore, the first chemically active agent and the second chemically active agent can be present together in the combined phase so that the chemical reaction occurs in the combined phase.

Any type of two (or more) component chemical reaction can be used, provided that the reaction results in the color change. For example, some color-changing chemical reaction, such as acid-base reactions, are affected by pH. Some color-changing chemical reactions are oxidation-reduction reactions.

One criteria that may be useful for selection of a component for a color changing reaction is the liquid phase composition that the reactants are to be dissolved in, such as an aqueous phase or an oil phase.

A useful class of oil soluble compounds showing intense color change on reaction is leuco dyes. These include compounds whose molecules can acquire two forms, one of which is colorless, or light colored, and the other of which is colored, sometimes strongly colored. The colorless form of a leuco dye can include substantially colorless compounds having a skeletal lactone, lactam, sulfone, spiropyran, ester or amido structure, including triarylmethane compounds, bisphenylmethane compounds, xanthene compounds, thiazine compounds, spiropyran compounds, and the like.

Examples of leuco dyes include, but are not limited to, crystal violet lactone. On development with a suitable leuco dye developer, examples of which are described elsewhere herein, crystal violet lactone forms a deep blue or violet color.

Some further examples of useful leuco dyes include products described as specialty magenta 20, ODB-1 and ODB-2 which are available from Emerald Hilton Davis, Cincinnati, Ohio and PERGASCRIPT® Red 16B available from BASF, Charlotte, N.C. Specialty magenta 20 and PERGASCRIPT® Red 16B produce an intense magenta color. Color precursors ODB-1 and ODB-2, upon development, become black.

Combinations of two or more mutually compatible leuco dyes can be employed. Combinations of crystal violet lactone and specialty magenta 20 can produce colors that can range from magenta to deep purple.

Some additional specific examples of useful leuco dyes include benzoyl leuco methylene blue, malachite green lactone, 3,3-bis(p-dimethylaminophenyl)phthalide, and N-2,4,5-trichlorophenyl leuco auramine.

Some examples of useful leuco dyes that can react with a color developer to produce a red color include 3-diethylamino-6-methyl-7-chlorofluoran, and 3,6-bis(diethylamino) fluoran-γ-(4'-nitro)-anilinolactam.

Some examples of leuco dyes that can be employed in color-changing emulsion embodiments of the temperature condition indicator and their manufacture and that can react with a color developer to produce a black color include 3-diethylamino-6-methyl-7-anilinofluoran and 3-(N-ethyl-N-isoamylamino)-6-methyl-7-anilinofluoran.

Some examples of useful leuco dyes that can react with a color developer to produce an orange color include 3-cyclohexylamino-6-chlorofluoran and 3-diethylamino-6,8-dimethylfluoran.

Still further useful leuco dyes are disclosed at column 3, line 28 to column 4, line 24 of U.S. Pat. No. 6,258,747 to Midorikawa et al., the disclosure of which is incorporated by reference herein, and at column 5, lines 16-61 of U.S. Pat. No. 6,514,909 to Austin et al., the disclosure of which is also incorporated by reference herein.

In the practice of the temperature condition indicator, the leuco dyes can be employed alone, or in combinations of two or more compatible compounds. Combination of leuco dyes can help to broaden the range of colors available for use.

Colorless forms of leuco dyes can be converted to the colored forms by a variety of compounds (referred to hereafter as "leuco color developers"), some examples of which are phenol derivatives, organic acids and acid clays. Such compounds and compositions can be employed as leuco color developers, provided they are compatible with other emulsion components.

Examples of suitable phenols for use as leuco dye developers include, but are not limited to, halogen substituted phenols, such as 4-bromo-2-fluorophenol, 2-bromo-5-fluorophenol, 2-chloro-5-fluorophenol, 2-chloro-6-methylphenol, etc.; liquid short-chain alkyl substituted phenols, such as 2-tert-butylphenol, 2-n-propylphenol, 3-n-propylphenol, etc; liquid short chain ether phenols, such as 2-isopropoxyphenol, 3-methoxy phenol, etc.

Leuco dye developers which can be employed also include mixtures of two or more halogen and/or short chain alkyl-substituted phenols having relatively low melting points, including: halogenated phenols having low melting points, such as 2-bromophenol (melting point about 5° C.), 2-bromo-4-methylphenol (melting point about 16° C.), etc.; and short chain alkylated phenols with low melting points, such as 2-sec-butylphenol, (melting point about 10°-12° C.), 4-n-pentylphenol (melting point about 24° C.), 2,6-diisopropylphenol (melting point about 17°-18° C.), 2-isopropylphenol (melting point about 14°-16° C.), 4-n-propylphenol (melting point about 20°-22° C.), etc.

One specific example of a useful acid clay leuco color developer is FULACOLOR™ XW, a reactive acid hectorite clay available from Rockwood Additives, Widnes, UK.

In some cases, polymeric resins can be employed as leuco color developers. Some useful polymeric resins include phenolic resins, phenol-acetylene resins and polyvalent metallic salts of phenolic resins, phenol-acetylene resins. A specific useful leuco color developer is HRJ 2053, a zinc-containing modified alkyl phenolic resin available from SI Group, Schenectady, N.Y.

Some further examples of materials useful as leuco color developers include zinc salicylate, zinc salicylate resin, 4,4'-isopropylidenediphenol, also known as bisphenol A, 1,7-di(hydroxyphenylthio)-3,5-dioxaheptane, 4-hydroxyethyl benzoate, 4-hydroxydimethyl phthalate, monobenzyl phthalate, bis-(4-hydroxy-2-methyl-5-ethylphenyl)sulfide, 4-hydroxy-4'-isopropoxydiphenylsulfone, 4-hydroxyphenylbenzenesulfonate, 4-hydroxybenzoyloxybenzyl benzoate, bis-(3-1-butyl-4-hydroxy-6-methylphenyl)sulfone, p-tert-butylphenol, and polymers based on bisphenol A.

If the active phase is a single phase (as opposed to two or more sub-phases), either the active phase or the base phase contains the leuco dye, and the remaining phase of the two contains the leuco color developer. For example, the base phase could contain the leuco dye and the active phase could contain the leuco color developer. Alternatively, the active phase could contain the leuco dye and the base phase could contain the leuco color developer. Alternatively, the first active sub-phase could contain the leuco dye and the second active sub-phase could contain the leuco color developer.

Halochromic indicators are a useful class of color changing chemicals for aqueous liquids. Halochromic indicators, or compounds that change color to indicate pH, may also be used to cause a color change when the active phase and the base phase mix. For example, one phase could contain the indicator, and the other phase could contain an aqueous acidic or basic solution. An acidic or basic solution may be prepared by simply adding an acid or base to water, or the acidic or basic solution could be buffered. Some examples of useful indicators (some of which are also leuco dyes)

include, but are not limited to, gentian violet, leucomalachite green, thymol blue, methyl yellow, bromophenol blue, congo red, methyl orange, bromocresol green, methyl red, azolitmin, bromocresol purple, bromothymol blue, phenol red, neutral red, napthophthalein, cresol red, thymophthalein, etc.

If the active phase is a single phase, either the active phase or the base phase contains the halochromic indicator, and the remaining phase of the two contains the acidic or basic solution. For example, the base phase could contain the halochromic indicator and the active phase could contain the acidic or basic solution. Alternatively, the active phase could contain the halochromic indicator and the base phase could contain the acidic or basic solution. Alternatively, the first active sub-phase could contain the halochromic indicator and the second active sub-phase could contain the acidic or basic solution.

A useful color changing oxidation-reduction involves the reduction of colorless silver compounds, such as silver laurate, silver palmitate, silver myristate, or the like, to metallic silver. Examples of compounds that can reduce these silver compounds include, but are not limited to, oxalic acid, formic acid, ascorbic acid, phosphite esters, hydrohydroquinone, hydroquinone derivatives such as dimethyhydroquinone, di-tert-butyl hydroquinone, other dialkylhydroquinones and the like, ferrous 2-hydroxypropanoate, etc. This type of reaction results in a color change from colorless to a shade of gray or black.

If the active phase is a single phase, either the active phase or the base phase contains the silver compound, and the remaining phase of the two contains the reducing compound. For example, the base phase could contain the silver compound and the active phase could contain the reducing compound. Alternatively, the active phase could contain the silver compound and the base phase could contain the reducing compound. Alternatively, the first active sub-phase could contain the silver compound and the second active sub-phase could contain the reducing compound.

Some reactions used in color-changing analytical methods may also be adapted for use in an indicator dispersion. For example, reagents for colorimetric or spot analysis of substances can be reacted with analytical target substances to produce a color change.

For example, the analytical reagent 2,6-dibromoquinone chlorimide can be co-reacted with a phenol to provide a color change from colorless to an intense blue color. Examples of suitable phenols include, but are not limited to, 3-ethoxyphenol; 1,2-diethyl-3-hydroxybenzene; 1,3-diethyl-2-hydroxybenzene; and 2,2'-methylenebis(3,4,6-trichlorophenol).

If the active phase is a single phase, either the active phase or the base phase contains the 2,6-dibromoquinone chlorimide, and the remaining phase of the two contains the phenol. For example, the base phase could contain the 2,6-dibromoquinone chlorimide and the active phase could contain the phenol. Alternatively, the active phase could contain the 2,6-dibromoquinone chlorimide and the base phase could contain the phenol. Alternatively, the first active sub-phase could contain the 2,6-dibromoquinone chlorimide and the second active sub-phase could contain the phenol.

In some embodiments, liquid primary and secondary amines for example, 4-butyl-aniline, can be reacted with 2,3,5,6-tetrachlorocyclohexa-2,5-diene-1,4-dione to produce a color change.

If the active phase is a single phase, either the active phase or the base phase contains the amine, and the remaining phase of the two contains the 2,3,5,6-tetrachlorocyclohexa-2,5-diene-1,4-dione. For example, the base phase could contain the amine and the active phase could contain the 2,3,5,6-tetrachlorocyclohexa-2,5-diene-1,4-dione. Alternatively, the active phase could contain the amine and the base phase could contain the 2,3,5,6-tetrachlorocyclohexa-2,5-diene-1,4-dione. Alternatively, the first active sub-phase could contain the amine and the second active sub-phase could contain the 2,3,5,6-tetrachlorocyclohexa-2,5-diene-1,4-dione.

For a w/o/w emulsion, it may be helpful if the reactants in the color-changing reaction are soluble in water but substantially insoluble in oil. This can help to prevent the reaction from occurring before the temperature condition is met. In some embodiments, one or both of the reactants are at least about 10 times or at least about 100 times, and up to about 1000 times, up to about $10^6$ times, or up to about $10^9$ times more soluble in water than in oil.

For an o/w/o emulsion, it may be helpful if the reactants in the color-changing reaction are soluble in oil but substantially insoluble in water. This can help to prevent the reaction from occurring before the temperature condition is met. In some embodiments, one or both of the reactants are at least about 10 times or at least about 100 times, and up to about 1000 times, up to about $10^6$ times, or up to about $10^9$ times more soluble in oil than in water.

Some examples of changes in the apparent color include changes between any two of white, gray, black, red, yellow, blue, green, purple, orange and brown, and any tints and shades of the foregoing colors. Some embodiments can exhibit a change from white, light or colorless before mixing of the active phase and base phase to red, black or violet after mixing of the active phase and the base phase.

The indicator dispersion can appear to be a different color after mixing of the active phase and the base phase. For example, an indicator dispersion could appear red before mixing of the active phase and the base phase and orange after mixing of the active phase and the base phase, yellow before mixing of the active phase and the base phase and orange after mixing of the active phase and the base phase, green before mixing of the active phase and the base phase and blue after mixing of the active phase and the base phase, etc. In some embodiments, an indicator dispersion appears more red after mixing of the active phase and the base phase. For example, the colors indigo, blue, green, yellow, orange, and red are all more red than the color violet; the colors blue, green, yellow, orange, and red are all more red than the color indigo; the colors green, yellow, orange, and red are all more red than the color blue; the colors yellow, orange, and red are all more red than the color green; the colors orange and red are more red than the color yellow; and the color red is more red than the color orange.

In some embodiments, an indicator dispersion appears more blue after mixing of the active phase and the base phase. For example, the colors orange, yellow, green, blue, indigo, and violet are all more blue than the color red; the colors yellow, green, blue, indigo, and violet are all more blue than the color orange; the colors green, blue, indigo, and violet are all more blue than the color yellow; the colors blue, indigo, and violet are all more blue than the color green; the colors indigo and violet are more blue than the color blue; and the color violet is more blue than the color indigo.

In some embodiments, the indicator dispersion appears darker after mixing of the active phase and the base phase. Use of the term "darker" includes a comparison where the darker phase appears darker to an ordinary observer in terms of the absence of white light, or may refer to a stronger, richer, or more readily discernible color.

In some embodiments, the indicator dispersion undergoes a change in opacity, such as a reduction in opacity, after mixing of the active phase and the base phase.

In addition to being detectable by observation by a person, the effect of light scattering, opacifying, or any other color changing effect on a natural color can be detected by an optical instrument. An optical instrument includes any device that can detect a change in apparent color of an indicator dispersion. Some optical instruments may detect the effect of light scattering on a natural color by detecting a change in the spectrum of visible light absorbed by, emitted by, or reflected from, an indicator dispersion.

A change in apparent color can be associated with, or related to, a change in a visible light spectrum of an indicator dispersion. For some indicators, a person observing the indicator dispersion will see a color that results from light that passes into or through the indicator dispersion, and is reflected back to the observer. Light scattering can cause a significant amount of light to be reflected back without being absorbed by the colorant in the indicator dispersion. This can cause the dispersion to appear lighter, white, translucent, or milky. It can also affect the visible light absorption spectrum of the indicator dispersion.

A visible light absorption spectrum of a sample can be taken by obtaining a spectrum of incident light that is reflected from or through a sample. If no scattering occurs, the absorption spectrum will be a plot of the amount of light absorbed that would otherwise be reflected back by or through the sample at the various wavelengths in the visible range. If scattering occurs, light that would otherwise be absorbed can be scattered back to the detector of the spectrometer instead of being absorbed, which can result in a lower absorbance in the absorption spectrum for wavelengths of light that are scattered, as compared to a sample where scattering does not occur. Thus, light scattering can be detected by comparison of a visible light absorption spectrum of the colorant in a single phase medium to a visible light absorption spectrum of the colorant in a light scattering emulsion, where the amount of the colorant, in mass per unit volume, is the same for the two samples.

Normally, an indicator dispersion will have the same amount of colorant, in mass per unit volume, before and after mixing of the active phase and the base phase. Thus, for some indicators, if an indicator dispersion meets a temperature condition, it can be detected by a change in the absorption spectrum caused by opacification, a color change of a component in the indicator dispersion, a loss of light scattering, or other change in light scattering, associated with the mixing of the active phase and the base phase. Although the effect of scattering on the spectrum of an indicator dispersion that emits light can be different than absorbance, scattering can also affect the emission spectrum of an emissive indicator emulsion. Thus, a change in a visible spectrum of an indicator emulsion can be a basis for detecting a temperature condition using an optical instrument, such as visible light absorption spectrometer, or a visible light fluorescent or phosphorescent spectrometer.

In addition to instruments such as spectrometers, changes in the apparent color or the spectrum of an indicator dispersion caused by meeting a temperature condition can often be detected by instruments that are not spectrometers, such as scanners, bar code readers, smart phones, etc.

In some embodiments, a 1 mm path of the indicator dispersion is at least about 0.05, at least about 0.1, at least about 0.2, at least about 0.4, at least about 1, or at least about 2 optical density units darker, or lighter, after a temperature condition is met. The term "optical density" is used herein refers to the log to the base 10 of the inverse of the incident light reflected from a sample. The term "darker" refers to a numerical value that is higher. For example, an optical density of 0.55 is darker than an optical density of 0.5

Optical density can be expressed by the formula $$OD_\lambda = \log_{10}(I_0/I)$$

where I is the intensity of light at a specified wavelength $\lambda$ that is reflected by a sample and $I_0$ is the intensity of the light before it enters the sample In some embodiments, a 1 mm path of the indicator dispersion is at least about 0.05, at least about 0.1, at least about 0.2, at least about 0.4, at least about 1, or at least about 2 optical density units darker after a temperature condition is met, wherein the optical density is darker at a wavelength in the range of about 380 nm to about 700 nm, about 380 nm to about 450 nm, about 450 nm to about 550 nm, about 550 nm to about 570 nm, about 570 nm to about 580 nm, about 590 nm to about 700 nm, about 380 nm to about 400 nm, about 400 nm to about 420 nm, about 420 nm to about 440 nm, about 440 nm to about 460 nm, about 460 nm to about 480 nm, about 480 nm to about 500 nm, about 500 nm to about 520 nm, about 520 nm to about 540 nm, about 540 nm to about 560 nm, about 560 nm to about 580 nm, about 580 nm to about 600 nm, about 600 nm to about 620 nm, about 620 nm to about 640 nm, about 640 nm to about 660 nm, about 660 nm to about 680 nm, or about 680 nm to about 700 nm.

A change in apparent color can be quantified by a change in one or more of three tristimulus values X, Y, and Z, as measured with a tristimulus colorimeter, such as one made by Hunter Labs. A measured difference in tristiumulus values may refer to the dispersion before a temperature condition is met as compared to the combined phase after a temperature condition is met, the emulsion before a temperature condition is met as compared to the barrier phase after a temperature condition is met, or the emulsion before a temperature condition is met as compared to some combination of the barrier phase, the combined phase, the active phase, and the base phase after a temperature condition is met. In some embodiments, the value of X changes after a temperature condition is met. In some embodiments, the value of Y changes after a temperature condition is met. In some embodiments, the value of Z changes after a temperature condition is met. In other embodiments some or all of the tristimulus values change in concert with each other.

A change in apparent color can also be quantified by a change in hiding power as measured with a Pfynd Cryptometer. In some embodiments, the hiding power may change after a temperature condition is met. In some embodiments the wet hiding power may change by several mil (several thousands of an inch); for example an emulsion might have wet hiding power value of 6 mil prior to a temperature condition is met, i.e. a wet film 6 mil in thickness obscures the difference between black and white backgrounds, while the same emulsion after a temperature condition is met might have a wet hiding power value of 15 mil or more.

A colorant in an indicator dispersion may be of any useful color, such as red, orange, yellow, blue, green, violet, or black. In some embodiments, an aqueous active phase contains a colorant that is water-soluble. For example, a colorant may have a water solubility of at least about 10 mg/mL, at least about 50 mg/mL, or at least about 100 mg/mL. It may also be helpful for the colorant to have a substantially greater solubility in water than in oil. For example the colorant can be at least 2 times, at least 5 times, at least 10 times, at least 50 times, at least 100 times, at least 1000 times, or at least 10,000 times more soluble in water than in oil by weight. It may also be helpful for a colorant to have a low oil solubility. Low oil solubility may avoid or reduce possible migration of the colorant into the hydrophobic phase, which may cause premature coloration of the indicator dispersion. For example, the colorant may have a solubility less than about 10 mg/mL, less than about 1 mg/mL, or less than about 0.1 mg/mL. Examples of suitable colorants include basic dyes such as methylene blue, malachite green, etc.; acid dyes such as Naphthalene Red EA, Naphthalene Scarlet 4R, Naphthalene Orange G; Acid Violet BN (C.I. 42615), Anthracene Black B (C.I. 26270), Azo Red A (C.I. 14910), Azo YellowConc. (C.I. 13096), Emin Red A (C.I. 16085), Erganon Blue 3 G (C.I. 58611), Erganon Blue B (C.I. 58501), ErganonGrey BB (C.I. 58061), Erganon Violet R (C.I. 58080), Fast Acid Phloxine A (C.I. 45155), Supramine Violet R (C.I. 13470), Acid Red 1, Acid Blue 80, Acid Green 25, Acid Red 114, Acid Blue 113, Acid Yellow 25, Acid Violet 7; Crystal Violet, etc.; acid-base indicators, such as phenolphthalein, gentian violet, leucomalachite green, thymol blue, methyl yellow, bromophenol blue, congo red, methyl orange, bromocresol green, methyl red, azolitmin, bromocresol purple, bromothymol blue, phenol red, neutral red, napthophthalein, cresol red, thymophthalein, etc. Basic dyes can have extinction coefficients an order of magnitude or more higher than acid dyes.

In some embodiments, a hydrophobic active phase contains a colorant that is soluble in oil or hydrophobic solvents. For example, a colorant may have a solubility of at least about 10 mg/mL, at least about 50 mg/mL, or at least about 100 mg/mL in oil or a hydrophobic solvent. It may also be helpful for the colorant to have a substantially greater solubility in water than in oil or a hydrophobic solvent. For example the colorant can be at least 2 times, at least 5 times, at least 10 times, at least 50 times, at least 100 times, at least 1000 times, or at least 10,000 times more soluble in water than in oil or a hydrophobic solvent by weight. It may also be helpful for a colorant to have a low water solubility. Low water solubility may avoid or reduce possible migration of the colorant into an aqueous phase, which may cause premature coloration of the indicator dispersion. For example, the colorant may have a solubility of less than about 10 mg/mL, less than about 1 mg/mL, or less than about 0.1 mg/mL in water.

A colorant that is an acid-base indicator, such as phenolphthalein can be useful in case the colorant is able to diffuse, or otherwise be transferred to an aqueous base phase from an aqueous active phase, while in a water-in-oil-in-water emulsion. For example, phenolphthalein is colorless at a pH below 7. Thus, if any phenolphthalein is transferred to the aqueous base phase, it can be rendered colorless by adjusting the pH of the aqueous base phase. A similar principle can be applied to other acid-base indicators, particularly acid-base indicators that are colorless within a certain pH range.

An indicator dispersion may contain any useful amount of a colorant. The proportion of colorant can be decreased to reduce color before a temperature condition is met, if present, or can be increased to increase color after a temperature condition is met, if desired. In some embodiments, the amount of colorant in the indicator dispersion is at least about 0.005%, at least about 0.002%, at least about 0.01%, at least about 0.05%, or up to about 0.05%, up to about 0.1%, up to about 1%, about 0.01% to about 1%, about 0.01% to about 5%, or about 0.01% to about 10%, based upon the weight of the colorant in the total weight of the dispersion.

An aqueous phase, such as an aqueous base phase or an aqueous active phase, can include any suitable aqueous liquid such as water. One or more water-miscible liquids having a melting point higher than that of water may optionally be included in the aqueous phase. For example, deuterium oxide ($D_2O$), deuterated water (HOD), or a mixture of deuterium oxide and deuterated water, may be combined with or substituted for light water. In some embodiments, an aqueous phase may be 90% to nearly 100% deuterated water and/or deuterium oxide. The melting point of an aqueous phase may be adjusted to correspond to a temperature condition to be monitored. Adjustment of the melting point may be carried out by suitable selection of aqueous ingredients and their proportions.

A hydrophobic phase can comprise any suitable hydrophobic material, such as a hydrophilic solid or liquid, including a liquid that is a water barrier, or tends to repel or not absorb water, or has a lack of affinity for water. In some embodiments, the hydrophobic liquid may have a water solubility that is less than about 10%, less than about 1%, less than about 0.01%, less than about 0.001%, or less than about 0.0001%. It may also be helpful to have a hydrophobic material that is unreactive with other components of the indicator dispersion, including the colorant, or with any housing or containment material that the temperature condition indicator may employ to contain the indicator dispersion in the context of the indicator dispersion.

Use of a hydrophobic material having a relatively high refractive index, such as greater than about 1.45 or about 1.5, can help provide a more opaque, or lighter colored dispersion in some cases. Vegetable oils, such as olive oil or sunflower oil, may have refractive indexes of about 1.47. Mineral oil has a refractive index of about 1.48. Hydrogenated terphenyl oils have a refractive index of about 1.52.

Some examples of useful oils or hydrophobic liquids include hydrocarbons such as heptane, octane, nonane, decane, undecane, dodecane, tridecane, hexadecane and the like, either linear or branched; aromatics such as toluene, xylene, etc., mineral oil, terphenyl oils, etc.; esters, including vegetable oils, such as soybean oil, cottonseed oil, linseed oil, rapeseed oil, castor oil, sunflower oil, olive oil, kernel oil, peanut oil, corn oil, canola oil, coconut oil, hazelnut oil, avocado oil, almond oil, arachis oil, safflower oil, maize oil, soybean oil, caraway oil, rosemary oil, peppermint oil, eucalyptus oil, sesame oil, coriander oil, lavender oil, citronella oil, juniper oil, lemon oil, orange oil, clary sage oil, nutmeg oil, tea tree oil, etc., liquid fatty acid esters, such as liquid fatty acid esters of lauric acid, palmitic acid, stearic acid, etc.; silicon oils, such as siloxanes, polysiloxanes, cyclopolysiloxanes, dimethicone, etc.; heteroatom functionalized hydrocarbons, including haloaromatic compounds such as halogenated aromatic compounds, phenols, alkoxyaromatics, perfluoroalkanes, etc. A mixture of two or more oils can also be used. One suitable terphenyl oil is available under the product code MCS 2811 from Solutia, St. Louis Mo. Some further suitable hydrophobic liquids are described in Taylor U.S. Pat. No. 8,430,053, for example, in paragraphs 0259-0274, which are incorporated by reference herein.

For a w/o/w dispersion, having a solid hydrophobic barrier phase may facilitate dispersion breakage when the inner water core freezes. Suitable hydrophobic materials could include fatty acids such as lauric acid, palmitic acid, stearic acid, etc., and their solid esters including glycerol mono, di or triesters of lauric acid, palmitic acid, etc., e.g.

glycerol monostearate; waxes such as paraffin wax, beeswax, etc.; and the admixtures of any or all of the above hydrophobic liquids may also be used in a hydrophobic phase. It may be useful to lower the melting point of some solid hydrophobic materials, such as paraffin wax. For example, the melting point of paraffin wax can be lowered from about 60° C. to, for example 30° C. by mixing in an appropriate proportion with mineral spirits or other hydrophobic diluent.

The active phase, the base phase, and the barrier phase may be present in any suitable ratios. In some embodiments, the aqueous active phase is about 0.001% to about 50%, about 0.001% to about 20%, about 0.01% to about 10%, about 0.01% to about 5%, or about 0.1% to about 1% of the total aqueous phase by weight.

Use of a water-in-oil-in-water emulsion may allow a reduced amount of oil to be used as compared to temperature condition indicators based on an oil-in-water emulsion. Low oil or hydrophobic phase may provide some advantages for some indicator compositions. For example, a lower oil temperature condition indicator may have better response characteristics, such as more consistent mixing of the active phase and the base phase at a given temperature. Higher oil may in some instances adversely affect heat conductivity or may impede the spread of crystallization through the aqueous phases. In some embodiments, the hydrophobic phase may be about 0.1% to about 40%, 0.5% to about 20%, about 0.1% to about 10%, or about 1% to about 5% of the total weight of the indicator dispersion.

One method of reducing hydrophobic liquid or oil content may be to have a high load of an aqueous active phase in a hydrophobic barrier phase. For example, the weight ratio of aqueous active phase to hydrophobic barrier phase may approach or even exceed 1:1 (aqueous active phase:hydrophobic phase), such as at least about 1:10, at least about 1:5, at least about 1:4, at least about 1:3, at least about 1:2, at least about 1:1, up to about 1:2, about 1:1, about 2:1, about 1:5 to about 2:1, about 1:4 to about 2:1, or about 1:2 to about 2:1.

For freeze indicators, an indicator dispersion may include an ice nucleant to help overcome supercooling and provide a freeze response at a temperature closer to the melting point of the dispersion medium than would occur if the ice nucleant or not present. An ice nucleant can reduce the effect of supercooling, elevate the freezing temperature of the active and/or aqueous base phase, and therefore of the indicator dispersion, and narrow the difference between the melting point of the freezing point of the indicator dispersion.

Useful ice nucleants include inorganic ice nucleants and proteinaceous ice nucleants derived from microorganisms. Some examples of useful inorganic ice nucleants include silver iodide, cold-precipitated silver iodide/silver bromide mixtures, and copper sulfide. An example of a useful proteinaceous ice nucleant is SNOWMAX™ Snow Inducer, a freeze-dried proteinaceous material available from Johnson Controls Inc., Milwaukee Wis. Some suitable ice nucleants are also described in Taylor U.S. Pat. No. 8,430,053, for example, in paragraphs 0322-0327, which are incorporated by reference herein. Any useful amount of ice nucleant may be used, such as about 0.1% to about 5% or about 0.2% to about 2% by weight.

Freeze indicators that employ a proteinaceous ice nucleant can include a protein stabilizer in the indicator dispersion to stabilize the ice nucleant against thermal or other degradation, if desired. Some examples of suitable protein stabilizers include formaldehyde, glutaraldehyde ($CHOCH_2CH_2CH_2CHO$), and other dialdehydes having more than 10 carbon atoms. Some suitable protein stabilizers are also described in Taylor U.S. Pat. No. 8,430,053, for example, in paragraphs 0328-0329, which are incorporated by reference herein. Any useful amount of protein stabilizer may be used, such as about 0.01% to about 1%, or about 0.05% to about 0.5% by weight.

If desired, a biocide may be included in an indicator dispersion that employs a proteinaceous ice nucleant to prevent microbial spoilage. Certain protein stabilizers, for example glutaraldehyde and other dialdehydes, can also serve as biocides, when used in an effective concentration. Other biocides may also be used.

To help maintain the stability of the indicator dispersion, an indicator dispersion may include a dispersion stabilizer. Some examples of suitable dispersion stabilizers include surfactants, such as anionic surfactants, cationic surfactants, zwitterionic surfactants, non-ionic surfactants or combinations thereof. In addition to those described above, in some embodiments, surfactants can include fatty acid salts, linear alkyl benzene sulfonates, dialkyl phosphates, linear alcohol sulfates, alkylphenol ethoxylates, sulfonated alkylphenol ethoxylates, fatty acid ester ethoxylates, ethylene oxide propylene oxide block copolymers, fatty acid sulfonates, betaines, quaternary ammonium salts. In some embodiments, Span 80 (a non-ionic surfactant within HLB number of 4.3, also known as Arlacel 80 [1,4-anhydro-6-O-[(9Z)-9-octadecenoyl]-D-glucitol]) may be useful to stabilize the aqueous active phase in the hydrophobic phase. In some embodiments, Tween 80 (a non-ionic surfactant within our HLB number of 15, also known as polysorbate 80 [3,6-anhydro-2,4,5-tris-O-(2-hydroxyethyl)-1-O-{2-[(9Z)-9-octadecenoyloxy]ethyl]hexitol]) may be useful to stabilize the hydrophobic phase in the aqueous base phase. In some embodiments, the dispersion stabilizer may be sodium stearate, sodium dodecyl sulfate, ammonium lauryl sulfate, sodium laurel phosphate, betaine, lauryl amido propyl dimethyl betaine, dodecyl trimethyl ammonium chloride, benzalkonium chloride, sorbitan monolaurate, and oleyl alcohol.

In other embodiments, so called Pickering emulsifiers may be used either exclusively or in addition to those already delineated. These are solid particulates with appropriately modified surface chemistry. For example hydrophobically surface modified silica nanoparticles, such as Aerosil R972 (Degussa Corporation) and the like may be used to make an initial water-in-oil emulsion that is then converted into the w/o/w emulsion in a second step with a different surface modified particle. An example of such a particle being fumed silica whose surface has been modified by adsorption or chemisorption to give the right balance of hydrophilicity and hydrophobicity. Many different materials may be adsorbed onto the surface of appropriate particles including surfactants. Useful Pickering emulsifiers are not limited to silica particles. In fact, many different particulates, of any 3 dimensional shapes, such as spherical, platelet, irregular etc., may be used including, but not limited to colloidal alumina, colloidal yttria, colloidal zirconia, etc.

Other stabilizers may include water-soluble or water absorbing polymers such as poly(vinylpyrrolidone); polysaccharide derivatives, such as cellulose derivatives, including carboxymethylcellulose, hydroxypropylmethylcellulose, etc., hyaluronic acid derivatives, etc.; water-soluble acrylics, such as polyacrylic acid, polymethacrylic acid, etc.; polyethylene oxides; starches; guar; alginates; chitosan; etc.

Any useful amount of dispersion stabilizer may be used, such as about 0.1% to about 10% or about 0.5% to about 5% by weight.

Some further dispersion stabilizers are also described in Taylor, U.S. Pat. No. 8,430,053 (Taylor '980), for example, in paragraphs 0275-301, which are incorporated by reference herein. Any useful amount of dispersion stabilizer may be used, such as about 0.1% to about 10% or about 0.5% to about 5% by weight.

Optionally, if a dispersion stabilizer is present, an indicator dispersion may include a destabilizer to facilitate low-temperature destabilization of the indicator dispersion. A low-temperature destabilizer may promote or enhance coagulation of a freeze indicator dispersion at freezing temperatures, without unacceptably impairing the warm temperature stability properties of the dispersion. A low-temperature destabilizer can be a concentration-sensitive destabilizing or coagulating agent, for example, and ionic compound or compounds, or another suitable compound or compounds such as a high molecular weight compound. The destabilizing action of the low-temperature sensitive destabilizer can depend upon the concentration of the destabilizer aqueous liquid. Generally, although not necessarily, a temperature stabilizer also present with a low-temperature destabilizer is employed.

Examples of low-temperature destabilizers include salts, such as inorganic salts, monovalent salts, and multivalent salts. Some examples of suitable salts include chlorides, sulfates, nitrates, and carboxylates of potassium, sodium, ammonium, calcium, magnesium, and mixtures thereof.

Other materials that can be employed as low-temperature destabilizers include high molecular weight cationic, anionic, zwitterionic and uncharged polymers having a weight average molecular weight of about 1000 Da to about 100,000 Da. Some examples of polymers useful as low-temperature destabilizers include polyacrylamides, polyvinyl alcohols, polyvinyl pyrrolidones, and poly acrylic acids. Some useful polymers may be water-soluble, and two more such polymers may be employed in a given indicator dispersion. Some suitable the stabilizers are also described in Taylor '980, for example, at paragraphs 0302-0310, which are incorporated by reference herein.

A low-temperature destabilizer, if employed, may be selected for its compatibility with a particular dispersion stabilizer present in an indicator dispersion. To illustrate, a polymeric destabilizer employed with an ionically stabilized indicator dispersion can carry an opposite charge to the charge carried by the indicator dispersion. For example, the cationic polymer including quaternary ammonium segments can be used to destabilize a stabilized indicator dispersion that employs an anionic stabilizer.

In some embodiments, an indicator dispersion may comprise, or consist essentially of, an aqueous base phase, an aqueous active phase, a hydrophobic barrier phase, and one or more optional components, wherein each optional component is a colorant, a solute, a surfactant, an acid, a base, a buffer, an ice nucleant, a protein stabilizer, the dispersion stabilizer, a low-temperature destabilizer, or a biocide.

In some embodiments, an indicator dispersion may be free of color-changing chemical co-reactants.

While there are many ways that an indicator dispersion may be prepared, one method that may be used is as follows. The colorant is dissolved in deionized water, and the colorant-containing aqueous solution is emulsified with an oil using a low hydrophilic-lipophilic balance (HLB) surfactant, such as Span 80 (a non-ionic surfactant within HLB number of 4.3, also known as Arlacel 80 [1,4-anhydro-6-O-[(9Z)-9-octadecenoyl]-D-glucitol]), to give a water-in-oil emulsion. The water-in-oil emulsion is then emulsified in deionized water using a higher HLB surfactant, such as Tween 80 (a non-ionic surfactant within our HLB number of 15, also known as polysorbate 80 [3,6-anhydro-2,4,5-tris-O-(2-hydroxyethyl)-1-O-{2-[(9Z)-9-octadecenoyloxy]ethyl}hexitol]).

There is an extensive literature on making multiple emulsions. For example, they may be prepared by a single or double step methods using appropriate surfactants such as anionic surfactants, cationic surfactants, non-ionic surfactants, etc. While any or all methods of making multiple emulsions may be employed in making the multiple emulsions, some surfactants may facilitate the transfer of colorants from the inner water phase into the hydrophobic phase. If this is a problem, Pickering emulsifiers can be used as described above.

A temperature condition indicator may comprise a housing and an indicator dispersion within the housing. The housing may be configured for the indicator dispersion to be optically readable externally of the temperature condition indicator. A temperature condition indicator may further comprise a substrate supporting the housing. In some embodiments, the housing and the substrate are flexible.

The following non-limiting embodiments are contemplated:

Embodiment 1

A temperature condition indicator comprising:

a housing; and an indicator dispersion within the housing, wherein the indicator dispersion comprises:

a base phase;

a barrier phase dispersed in the base phase; and an active phase dispersed in the barrier phase;

wherein the active phase is miscible with the base phase;

wherein the barrier phase is substantially insoluble in the base phase and the active phase is substantially insoluble in the barrier phase; and wherein the temperature condition indicator is configured so that before the temperature condition is met, the barrier phase effectively separates the active phase from the base phase; and the temperature condition indicator is configured so that if the temperature condition is met, a significant amount of mixing will occur between the active phase and the base phase to form a combined phase;

wherein, if the combined phase is formed, a detectable and irreversible change in an apparent color of the indicator dispersion occurs; and wherein the housing is configured so that the detectable and irreversible change in the apparent color of the indicator dispersion is detectable externally of the temperature condition indicator by visual inspection or by an optical instrument.

Embodiment 2

The temperature condition indicator of embodiment 1, wherein the active phase or the barrier phase has a droplet size such that, before the temperature condition is met, light scattering affects the apparent color of the indicator dispersion.

Embodiment 3

The temperature condition indicator of embodiment 1 or embodiment 2, wherein the barrier phase contains an opacifying agent.

Embodiment 4

The temperature condition indicator of any preceding embodiment, wherein a chemical reaction occurs if the active phase mixes with the base phase.

Embodiment 5

The temperature condition indicator of embodiment 4, wherein:
the active phase comprises a first active sub-phase comprising a first chemically active agent and a second active sub-phase comprising a second chemically active agent;
wherein the barrier phase separates the first active sub-phase from the second active sub-phase; and
if mixing between the active phase and the base phase occurs, it causes the first chemically active agent and the second chemically active agent to be present together in the combined phase so that the chemical reaction occurs in the combined phase.

Embodiment 6

The temperature condition indicator of embodiment 4 or 5, wherein the chemical reaction is affected by pH.

Embodiment 7

The temperature condition indicator of embodiment 4 or 5, wherein the chemical reaction is an oxidation-reduction reaction.

Embodiment 8

The temperature condition indicator of any preceding embodiment, wherein, if mixing between the active phase and the base phase occurs, it is a result of freezing.

Embodiment 9

The temperature condition indicator of any preceding embodiment, wherein, if mixing between the active phase and the base phase occurs, it is a result of the indicator reaching a threshold temperature.

Embodiment 10

The temperature condition indicator of embodiment 9, wherein the threshold temperature is reached as a result of the indicator experiencing a decrease in temperature.

Embodiment 11

The temperature condition indicator of embodiment 9, wherein the threshold temperature is reached as a result of the indicator experiencing an increase in temperature.

Embodiment 12

The temperature condition indicator of any of embodiments 9-11, wherein, if mixing between the active phase and the base phase occurs, it is a result of phase inversion between the active phase and the barrier phase.

Embodiment 13

The temperature condition indicator of any of embodiments 9-11, wherein, if mixing between the active phase and the base phase occurs, it is a result of phase inversion between the barrier phase and the base phase.

Embodiment 14

The temperature condition indicator of embodiment 12 or 13, wherein the indicator dispersion comprises a surfactant that has a hydrophilic-lipophilic balance (HLB) that varies with temperature.

Embodiment 15

The temperature condition indicator of embodiment 12 or 13, wherein the indicator dispersion comprises a surfactant that has an HLB that is dependent upon pH and a buffer that has a pH that varies with temperature.

Embodiment 16

The temperature condition indicator of any preceding embodiment, wherein, if mixing between the active phase and the base phase occurs, it is a result of a particular thermal history of the indicator.

Embodiment 17

The temperature condition indicator of any preceding embodiment, wherein both: 1) the temperature condition indicator is configured so that, if the indicator reaches a threshold temperature, mixing between the active phase and the base phase will occur, and 2) the temperature condition indicator is configured so that, if the indicator experiences a particular thermal history, mixing between the active phase and the base phase will occur.

Embodiment 18

The temperature condition indicator of embodiment 16 or 17, wherein, if the indicator experiences the particular thermal history, diffusion of water through the barrier phase will cause breakdown of the indicator dispersion, wherein the diffusion of water through the barrier phase is a result of a difference in solute concentration between the active phase and the base phase.

Embodiment 19

The temperature condition indicator of embodiment 18, wherein the active phase has a higher solute concentration than the base phase.

Embodiment 20

The temperature condition indicator of embodiment 18, wherein the active phase has a lower solute concentration than the base phase.

Embodiment 21

The temperature condition indicator of any preceding embodiment, wherein the base phase is aqueous, the barrier phase is hydrophobic, and the active phase is aqueous.

Embodiment 22

The temperature condition indicator of any of embodiments 1-20, wherein the base phase is hydrophobic, the barrier phase is aqueous, and the active phase is hydrophobic.

Embodiment 23

The temperature condition indicator of any preceding embodiment, wherein the apparent color of the indicator dispersion appears darker after the temperature condition is met.

Embodiment 24

The temperature condition indicator of any preceding embodiment, wherein the active phase contains a colorant having a natural color that is not substantially changed after the temperature condition is met.

Embodiment 25

The temperature condition indicator of any preceding embodiment, wherein the detectable and irreversible change in the apparent color of the indicator dispersion caused if the temperature condition is met is substantially caused by a change in the scattering effect.

Embodiment 26

The temperature condition indicator of any preceding embodiment, wherein the indicator dispersion is configured so that, if the temperature condition is met, a colorant becomes dispersed in the combined phase.

Embodiment 27

The temperature condition indicator of any preceding embodiment, wherein the indicator dispersion is configured so that, if the temperature condition is met, light scattering has a reduced effect on the apparent color of the indicator dispersion.

Embodiment 28

The temperature condition indicator of any preceding embodiment, wherein the indicator dispersion is configured so that, if the temperature condition is met, light scattering has substantially no effect on the apparent color of the indicator dispersion.

Embodiment 29

The temperature condition indicator of any preceding embodiment, wherein the indicator dispersion is configured so that, if the temperature condition is met, a substantial amount of the active phase is no longer dispersed in the barrier phase.

Embodiment 30

The temperature condition indicator of any preceding embodiment, wherein the indicator dispersion is configured so that, if the temperature condition is met, the active phase is substantially no longer dispersed in the barrier phase.

Embodiment 31

The temperature condition indicator of any preceding embodiment, wherein the indicator dispersion is configured so that, if the temperature condition is met, a substantial amount of the barrier phase is no longer dispersed in the base phase.

Embodiment 32

The temperature condition indicator of any preceding embodiment, wherein the indicator dispersion is configured so that, if the temperature condition is met, the barrier phase is substantially no longer dispersed in the base phase.

Embodiment 33

The temperature condition indicator of any preceding embodiment, wherein the indicator dispersion is configured so that, if the temperature condition is met, the indicator dispersion is broken to form a two phase system comprising the barrier phase and the combined phase.

Embodiment 34

The temperature condition indicator of any preceding embodiment, wherein the active phase has an average droplet size of about 100 nm to about 1200 nm.

Embodiment 35

The temperature condition indicator any preceding embodiment, wherein the barrier phase has a solubility in the base phase that is less than about 1%.

Embodiment 36

The temperature condition indicator any preceding embodiment, wherein the barrier phase has a solubility in the base phase that is less than about 0.1%.

Embodiment 37

The temperature condition indicator of any of embodiments 1-2 and 4-17, wherein the barrier phase comprises a hydrocarbon, an ester, a silicon oil, or a heteroatom functionalized hydrocarbon.

Embodiment 38

The temperature condition indicator of any of embodiments 21 and 23-36, wherein the hydrophobic phase comprises heptane, octane, nonane, decane, undecane, dodecane, tridecane, hexadecane, toluene, xylene, mineral oil, terphenyl oil, soybean oil, cottonseed oil, linseed oil, rapeseed oil, castor oil, sunflower oil, olive oil, kernel oil, peanut oil, corn oil, canola oil, coconut oil, hazelnut oil, avocado oil, almond oil, arachis oil, safflower oil, maize oil, soybean oil, caraway oil, rosemary oil, peppermint oil, eucalyptus oil, sesame oil, coriander oil, lavender oil, citronella oil, juniper oil, lemon oil, orange oil, clary sage oil, nutmeg oil, tea tree oil, a liquid fatty acid ester of lauric acid, a liquid fatty acid ester of palmitic acid, a liquid fatty acid ester of stearic acid, a siloxane, a polysiloxanes, a cyclopolysiloxanes, dimethicone, a phenol, an alkoxyaromatic, or a perfluoroalkane.

Embodiment 39

The temperature condition indicator of any preceding embodiment, wherein the barrier phase has an average droplet size of about 100 nm to about 1200 nm.

Embodiment 40

The temperature condition indicator of any preceding embodiment, wherein the indicator dispersion has an absorption spectrum before the temperature condition is met that is different than an absorption spectrum of the indicator dispersion after the temperature condition is met, wherein the difference is detectable by an instrument.

Embodiment 41

The temperature condition indicator of embodiment 40, wherein a 1 mm path of the indicator dispersion is at least 0.05 optical density units darker after the temperature condition is met.

Embodiment 42

The temperature condition indicator embodiment 40, wherein the optical density is darker at a wavelength in a range of about 300 nm to about 700 nm.

Embodiment 43

The temperature condition indicator of any preceding embodiment, wherein the indicator dispersion further comprises an ice-nucleating agent.

Embodiment 44

The temperature condition indicator of any preceding embodiment, wherein the indicator dispersion comprises a water-soluble colorant.

Embodiment 45

The temperature condition indicator of any preceding embodiment, further comprising a substrate supporting the housing.

Embodiment 46

The temperature condition indicator of embodiment 45, wherein the housing and the substrate are flexible.

Embodiment 47

The temperature condition indicator of any preceding embodiment, further comprising a host product, wherein the temperature condition indicator monitors the host product for freeze exposure.

Embodiment 48

The temperature condition indicator of any preceding embodiment, wherein an ordinary person can perceive the change in apparent color by visual inspection.

Embodiment 49

A label for a perishable good, comprising a temperature condition indicator of any preceding embodiment.

Embodiment 50

A package for a perishable good, comprising a temperature condition indicator of any of embodiments 1-48.

Embodiment 51

A package containing a perishable good, comprising a temperature condition indicator of any of embodiments 1-48.

Embodiment 52

A method of protecting a perishable item, comprising coupling the perishable item with a temperature condition indicator of any of embodiments 1-48 so that the temperature condition indicator is subject to substantially the same temperature conditions as the perishable item.

Embodiment 53

The method of embodiment 52, further comprising inspecting the temperature condition indicator for the detectable and irreversible change in the apparent color of the indicator dispersion.

Embodiment 54

The method of embodiment 53, further comprising discarding the item if the detectable and irreversible change in the apparent color of the indicator dispersion is detected.

Embodiment 55

Use of a temperature condition indicator of any of embodiments 1-48 in monitoring the quality of a perishable good.

Embodiment 56

A method of detecting a temperature condition, comprising subjecting a temperature condition indicator of any of embodiments 1-48 to conditions under which the temperature condition might occur, and observing whether a detectable and irreversible change in the apparent color of the indicator dispersion occurs.

Figure 2:
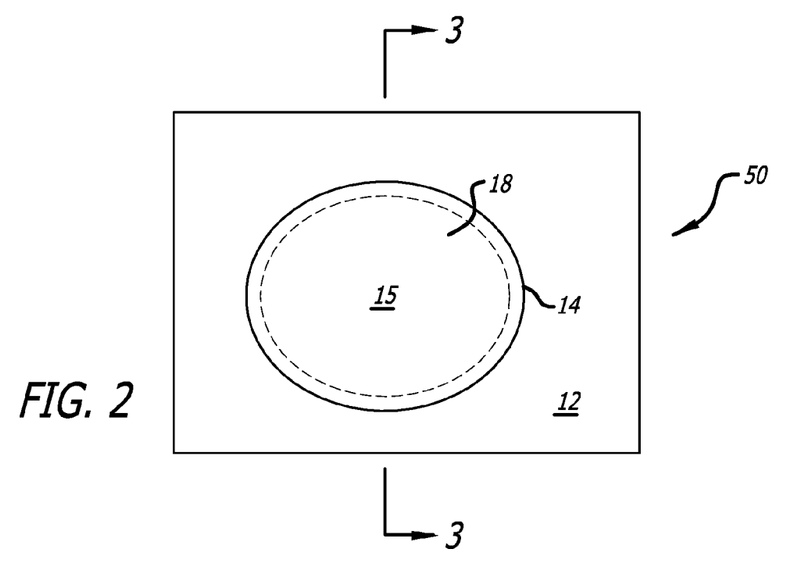
FIG. 2 is a plan view of an embodiment of a temperature condition indicator employing light scattering.
Figure 3:
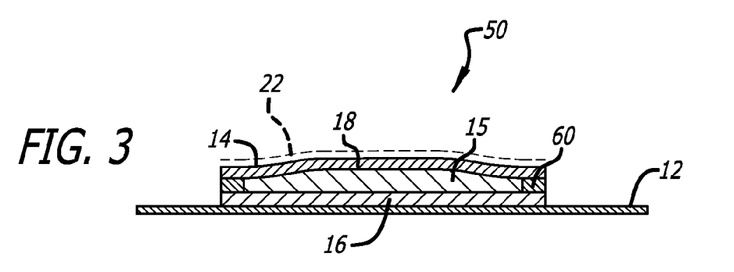
FIG. 3 is a sectional view on the line 2-2 of the temperature condition indicator shown in FIG. 2.
Figure 4:
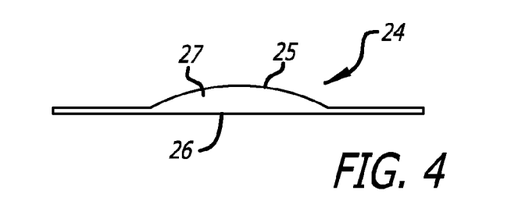
FIG. 4 is a view similar to FIG. 2 of another embodiment of a temperature condition indicator.

FIGS. 2-4 illustrate examples of temperature condition indicators comprising a housing and a substrate. In these figures, the housing may include any or all of the features in the drawing that are not the substrate. Referring now to FIGS. 2 and 3 of the accompanying drawings, the temperature condition indicator shown, referenced 50, includes a substrate 12 supporting an envelope 14, which contains a volume of an indicator dispersion 15, which can be any of the indicator dispersions described herein. As shown, envelope 14 can be approximately circular. Alternatively, envelope 14 can have another desired shape, for example, oval, hexagonal, square, rectangular, strip-like or ring-like. Envelope 14, as shown, includes an inner wall 16 and an outer wall 18 joined together by a ring of adhesive 60, or joined in another suitable manner, for example by fusing. Also, the joint, or seal between inner wall 16 and outer wall 18 can have low permeability to water vapor. Alternatively, envelope 14 can be a one-piece sealed sac.

Inner wall 16 of envelope 14 can be adhered to, deposited on, or otherwise attached to, substrate 12 so as to attach envelope 14 to substrate 12. Alternatively, substrate 12 can provide inner wall 16 as an integral component of the substrate. For example, inner wall 16 can include a layer, or insert, of aluminum or other material substantially impermeable to water vapor and aqueous liquids, formed integrally with substrate 12 or as a separate element.

Outer wall 18 of envelope 14 includes a transparent window (not referenced) which can occupy approximately the entire footprint of envelope 14 on substrate 12, if desired. Alternatively, the transparent window can occupy a smaller area or the entire envelope 14 can be transparent. The transparent window enables an optical signal generated by temperature condition indicator 50, for example, a change in color, to be read externally by a suitable instrument, by a human viewer, by a camera, by an optical detector, or in another suitable manner. Envelope 14 can be formed of materials having a low permeability to water vapor to protect indicator dispersion 15 from drying out, if desired. Any joint between inner wall 16 and outer wall 18 of envelope 14 also can have low water-vapor-permeability, if desired.

Optionally, outer wall 18 of envelope 14 can be provided with a color filter 22, for example, as a light-modulating coating of an ink, a lacquer, a paint, or another suitable coating material on outer wall 18. Alternatively, color filter 22, can be a separate element such as a separate layer. Color filter 22 can be transparent to enable the appearance of the indicator dispersion to be viewed through the filter. In one embodiment, color filter 22 has a transparent green color, indicator dispersion 15 is light-colored before a temperature condition is met, and is dark-colored or black after a temperature condition is met, so that the temperature condition indicator shows a change from green before a temperature condition is met to dark, or black, after a temperature condition is met.

The temperature condition indicator illustrated in FIG. 4, referenced 24, can be generally similar to that shown in FIGS. 2 and 3 with the differences that are apparent from the following description. Temperature condition indicator 24 can include an upper blister portion 25 and a lower substrate portion 26 defining between them an indicator volume 27 that can contain an indicator dispersion such as described herein. Upper blister portion 25 can be preformed from a synthetic polymeric film material, for example polyvinyl chloride. Also, substrate portion 26 can be formed in one piece with upper blister portion 25 and can be sealed to substrate portion 26 in any suitable manner, for example, by heat sealing or by use of an adhesive. Alternatively, blister portion 25 and substrate portion 26 can be formed in one piece. Temperature condition indicator 24 can be flexible, if desired, for example sufficiently flexible that substrate portion 25 can be curved into a semicircle or a circle.

Temperature condition indicator 24 can be embodied in a variety of configurations, including relatively small configurations. One illustrative example of a small embodiment of temperature condition indicator 24 has a blister diameter (or equivalent dimension) of not more than about 4 mm, a blister height (the vertical dimension in FIG. 4) of not more than about 0.6 mm, and an indicator volume of not more than about 5 µL. Another example of a larger embodiment of temperature condition indicator 24 has a blister diameter (or equivalent dimension) of about 12 mm, a blister height (the vertical dimension in FIG. 3) of about 1.2 mm, and an indicator volume of about 80 µL. These dimensions are merely exemplary and temperature condition indicator 24 can have smaller or larger configurations.

Temperature condition indicators described herein can have any suitable thickness in the direction of optical reading, for example, in the case of the temperature condition indicator illustrated in FIGS. 2 and 3, a thickness up to about 1 mm between inner wall 16 and outer wall 18 across the envelope 14 in which indicator dispersion 15 is accommodated. For some purposes, however, temperature condition indicator embodiments can have a thin or low profile, having a thickness of the indicator dispersion of from about 10 µm (microns) to about 0.3 mm, for example.

Temperature condition indicators can have various other structural characteristics including any of the structural characteristics of the freeze indicators described in Taylor '980. The disclosure of Taylor '980 related to structural characteristics of freeze indicators is incorporated by reference herein.

Some illustrative and nonlimiting examples follow of the preparation and characterization of some useful indicator dispersions.

Temperature condition indicators described herein can be used with a variety of temperature-sensitive host products to indicate historically possible exposure of the host product to a temperature condition. Suitable host products include any temperature sensitive commercial product, for example, temperature-sensitive health care products, vaccines, drugs, medicaments, pharmaceuticals, biological pharmaceuticals, temperature-sensitive foodstuffs, or temperature-sensitive industrial products. Some other temperature-sensitive host products that can be monitored by a freeze indicator described herein are described in the Taylor '980. The disclosure of Taylor '980 related to freeze sensitive host products is incorporated by reference herein. Some embodiments include a temperature-sensitive host product having a temperature indicator described herein associated with it.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A temperature condition indicator comprising:
a housing; and
an indicator dispersion within the housing, wherein the indicator dispersion comprises:
a base phase;
a barrier phase dispersed in the base phase; and
an active phase dispersed in the barrier phase;
wherein the active phase is miscible with the base phase;
wherein the barrier phase is substantially insoluble in the base phase and the active phase is substantially insoluble in the barrier phase; and
wherein the temperature condition indicator is configured so that before the temperature condition is met, the barrier phase effectively separates the active phase from the base phase; and
wherein the temperature condition indicator is configured so that if the temperature condition is met, a significant amount of mixing will occur between the active phase and the base phase to form a combined phase;
wherein, if the combined phase is formed, a detectable and irreversible change in an apparent color of the indicator dispersion occurs; and
wherein the housing is configured so that the detectable and irreversible change in the apparent color of the indicator dispersion is detectable externally of the temperature condition indicator by visual inspection or by an optical instrument.

2. The temperature condition indicator of claim 1, wherein the active phase or the barrier phase has a droplet size such that, before the temperature condition is met, light scattering affects the apparent color of the indicator dispersion.

3. The temperature condition indicator of claim 1, wherein the barrier phase contains an opacifying agent.

4. The temperature condition indicator of claim 1, wherein a chemical reaction occurs if the active phase mixes with the base phase.

5. The temperature condition indicator of claim 4, wherein:
the active phase comprises a first active sub-phase comprising a first chemically active agent and a second active sub-phase comprising a second chemically active agent;
wherein the barrier phase separates the first active sub-phase from the second active sub-phase; and
if mixing between the active phase and the base phase occurs, it causes the first chemically active agent and the second chemically active agent to be present together in the combined phase so that the chemical reaction occurs in the combined phase.

6. The temperature condition indicator of claim 4, wherein the chemical reaction is affected by pH or is an oxidation-reduction reaction.

7. The temperature condition indicator of claim 1, wherein, if mixing between the active phase and the base phase occurs, it is a result of freezing or a result of the indicator reaching a threshold temperature.

8. The temperature condition indicator of claim 7, wherein the threshold temperature is reached as a result of the indicator experiencing a decrease in temperature.

9. The temperature condition indicator of claim 7, wherein the threshold temperature is reached as a result of the indicator experiencing an increase in temperature.

10. The temperature condition indicator of claim 1, wherein, if mixing between the active phase and the base phase occurs, it is a result of phase inversion between the active phase and the barrier phase or between the barrier phase and the base phase.

11. The temperature condition indicator of claim 1, wherein the base phase is aqueous, the barrier phase is hydrophobic, and the active phase is aqueous.

12. The temperature condition indicator of claim 11, wherein the hydrophobic phase comprises heptane, octane, nonane, decane, undecane, dodecane, tridecane, hexadecane, toluene, xylene, mineral oil, terphenyl oil, soybean oil, cottonseed oil, linseed oil, rapeseed oil, castor oil, sunflower oil, olive oil, kernel oil, peanut oil, corn oil, canola oil, coconut oil, hazelnut oil, avocado oil, almond oil, arachis oil, safflower oil, maize oil, soybean oil, caraway oil, rosemary oil, peppermint oil, eucalyptus oil, sesame oil, coriander oil, lavender oil, citronella oil, juniper oil, lemon oil, orange oil, clary sage oil, nutmeg oil, tea tree oil, a liquid fatty acid ester of lauric acid, a liquid fatty acid ester of palmitic acid, a liquid fatty acid ester of stearic acid, a siloxane, a polysiloxanes, a cyclopolysiloxanes, dimethicone, a phenol, an alkoxyaromatic, or a perflouroalkane.

13. The temperature condition indicator of claim 1, wherein the base phase is hydrophobic, the barrier phase is aqueous, and the active phase is hydrophobic.

14. The temperature condition indicator of claim 1, wherein the indicator dispersion is configured so that, if the temperature condition is met, a colorant becomes dispersed in the combined phase.

15. The temperature condition indicator of claim 1, wherein the indicator dispersion further comprises an ice-nucleating agent.

16. The temperature condition indicator of claim 1, wherein the housing and the substrate are flexible.

17. The temperature condition indicator of claim 1, further comprising a host product, wherein the temperature condition indicator monitors the host product for freeze exposure.

18. The temperature condition indicator of claim 1, wherein an ordinary person can perceive the change in apparent color by visual inspection.

19. A label for a perishable good, comprising a temperature condition indicator of claim 1.

20. A method of protecting a perishable item, comprising coupling the perishable item with a temperature condition indicator of claim 1 so that the temperature condition indicator is subject to substantially the same temperature conditions as the perishable item.

* * * * *